US009634308B2

(12) United States Patent
Chen et al.

(10) Patent No.: US 9,634,308 B2
(45) Date of Patent: Apr. 25, 2017

(54) SINGLE LAYER STRUCTURE OF MICRON FIBERS APPLIED IN SEPARATOR FOR BATTERY

(71) Applicant: INDUSTRIAL TECHNOLOGY RESEARCH INSTITUTE, Hsinchu (TW)

(72) Inventors: Wan-Shu Chen, Hsinchu (TW); Shu-Hui Cheng, Hsinchu County (TW); Jung-Ching Hsing, Hsinchu (TW); Tzu-Hsien Han, Hsinchu (TW); Ming-Lung Lee, Hsinchu (TW)

(73) Assignee: INDUSTRIAL TECHNOLOGY RESEARCH INSTITUTE, Hsinchu (TW)

(*) Notice: Subject to any disclaimer, the term of this patent is extended or adjusted under 35 U.S.C. 154(b) by 0 days.

(21) Appl. No.: 14/977,176

(22) Filed: Dec. 21, 2015

(65) Prior Publication Data

US 2016/0111697 A1    Apr. 21, 2016

Related U.S. Application Data

(62) Division of application No. 14/096,110, filed on Dec. 4, 2013, now Pat. No. 9,287,541.

(30) Foreign Application Priority Data

Dec. 12, 2012 (TW) .............................. 101146967 A

(51) Int. Cl.
*H01M 2/16* (2006.01)
*H01M 2/14* (2006.01)

(52) U.S. Cl.
CPC ......... *H01M 2/162* (2013.01); *H01M 2/1686* (2013.01); *H01M 2/145* (2013.01)

(58) Field of Classification Search
CPC ..... H01M 2/162; H01M 2/1686; H01M 2/145
See application file for complete search history.

(56) References Cited

U.S. PATENT DOCUMENTS

| 4,286,030 A * | 8/1981 | Moore ................ B01D 39/163 |
| | | 156/335 |
| 6,485,856 B1 * | 11/2002 | Brown ................ D04H 1/4209 |
| | | 429/142 |

(Continued)

FOREIGN PATENT DOCUMENTS

CN        101068043 A    11/2007
CN        101680142 A    3/2010

(Continued)

OTHER PUBLICATIONS

Prasanth Raghavan et al., "Preparation and electrochemical characterization of gel polymer electrolyte based on electrospun polyacrylonitrile nonwoven membranes for lithium batteries", Journal of Power Sources 196, pp. 6742-6749, Nov. 2, 2010.

(Continued)

*Primary Examiner* — Stewart Fraser
(74) *Attorney, Agent, or Firm* — Rabin & Berdo, P.C.

(57) ABSTRACT

A single layer structure of micron or nano fibers, and a multi-layer structure of micron and nano fibers. The single layer structure of micron fibers includes a web of micron fibers and an impregnating resin, and has a pore size of 1 nm-500 nm. The web of micron fibers is formed by plural interweaved micron fibers (D≥1 μm). The single layer structure of nano fibers includes a web of nano fibers formed by plural interweaved nano fibers (D<1 μm). The multi-layer structure of micron and nano fibers includes a web of interweaved micron fibers, a web of nano fibers formed by plural nano fibers interweaved on the web of micron fibers, a mixture layer formed by parts of the interweaved nano and (Continued)

micron fibers, and a resin at least impregnating the mixture layer and parts of the micron fibers of the web of micron fibers.

8 Claims, 4 Drawing Sheets

(56) References Cited

U.S. PATENT DOCUMENTS

| | | | |
|---|---|---|---|
| 6,677,073 B1* | 1/2004 | Brown | D04H 1/4242 429/481 |
| 7,803,460 B2 | 9/2010 | Lee et al. | |
| 7,875,380 B2* | 1/2011 | Chun | B32B 27/12 156/60 |
| 8,105,716 B2 | 1/2012 | Sheem et al. | |
| 2008/0182167 A1 | 7/2008 | Kritzer | |
| 2008/0274658 A1 | 11/2008 | Simmonds et al. | |
| 2009/0166295 A1 | 7/2009 | Chen et al. | |
| 2011/0229750 A1 | 9/2011 | McLellan et al. | |
| 2013/0171499 A1* | 7/2013 | Yang | H01M 2/162 429/145 |
| 2013/0236766 A1* | 9/2013 | Seo | H01M 2/145 429/144 |
| 2014/0038024 A1 | 2/2014 | Huang | |
| 2015/0030906 A1* | 1/2015 | Amin-Sanayei | H01G 11/52 429/144 |

FOREIGN PATENT DOCUMENTS

| | | |
|---|---|---|
| CN | 101988221 A | 3/2011 |
| CN | 102140762 A | 8/2011 |
| CN | 102299287 A | 12/2011 |
| JP | 2009123399 A | 6/2009 |
| JP | 2010033891 A | 2/2010 |
| JP | 4812266 B2 | 11/2011 |
| KR | 10-2014-0023757 A | 2/2014 |
| TW | I261045 B | 9/2006 |
| TW | I398353 B | 6/2013 |

OTHER PUBLICATIONS

Hyun-Seok Jeong et al., "Potential application of microporous structured poly (vinylidene fluoride-hexafluoropropylene) / poly (ethylene terephthalate) composite nonwoven separators to high-voltage and high-power lithium-ion batteries", Electrochimica Acta 56, pp. 5201-5204, Mar. 17, 2011.

Yong Min Lee et al., "Electrochemical effect of coating layer on the separator based on PVdF and PE non-woven matrix", Journal of Power Sources 146, pp. 431-435, Jun. 3, 2005.

Hyun-Seok Jeong et al., "Effect of phase inversion on microporous structure development of Al2O3/poly (vinylidene fluoride-hexafluoropropylene)-based ceramic composite separators for lithium-ion batteries", Journal of Power Sources 195, pp. 6116-6121, Nov. 10, 2009.

Tae-Hyung Cho et al., "Composite nonwoven separator for lithium-ion battery: Development and characterization", Journal of Power Sources 195, pp. 4272-4277, Jan. 18, 2010.

Sheng Shui Zhang, "A review on the separators of liquid electrolyte Li-ion batteries", Journal of Power Sources 164, pp. 351-364, Nov. 22, 2006.

Office Action issued by Taiwan Intellectual Property Office on Jun. 12, 2014.

Chinese Office Action dated Feb. 16, 2015.

* cited by examiner

SINGLE LAYER STRUCTURE OF MICRON FIBERS APPLIED IN SEPARATOR FOR BATTERY

This application is a Divisional of pending U.S. patent application Ser. No. 14/096,110, filed Dec. 4, 2013 and entitled "SINGLE FIBER LAYER STRUCTURE OF MICRON OR NANO FIBERS AND MULTI-LAYER STRUCTURE OF MICRON AND NANO FIBERS APPLIED IN SEPARATOR FOR BATTERY" (now allowed). This application claims the benefit of Taiwan application Serial No. 101146967, filed Dec. 12, 2012, the disclosure of which is incorporated by reference herein in its entirety.

TECHNICAL FIELD

The disclosure relates in general to a single layer structure of fiber, and more particularly to a single layer structure of micron or nano fibers and a multi-layer structure of micron and nano fibers applied in separator for battery.

BACKGROUND

If electric cars and portable electronic products adopt paper-thin power battery, the demand for paper-thin and high-efficient separator will increase dramatically. According to the forecast of market size and demand for global vehicle power battery, the demand will increase to 0.562 billion square meters ($m^2$) and the price will increase to 2.2 USD/$m^2$ by the end of 2013. Along with the rapid growth in the market of electric cars, the development of separator will depend on the market demand of vehicles and production scale.

Most separators for power battery currently available in the market are mainly porous film types. A thin-type single-layer or multi-layer film is formed by way of melt stretching, coating and drying, or hot pressing. Let the separator applied in lithium battery and provided by the Celgard, LLC of USA and the Ube Industries Ltd. of Japan be taken for example. Porous separator having a thickness less than 20 um is formed by melt stretching process. The flux of high polymer when extruded is crystallized under a tensile stress and forms a lamellae structure which is perpendicular to extrusion direction and is arranged in parallel. Then, the lamellar structure is processed with heat treatment to obtain a hard elastic material. Then, slit pores are formed when lamellae is separated after the polymer film is stretched. Then, the polymer film is processed with thermal setting treatment to form a microporous film. However, the above method for manufacturing a microporous film has following disadvantages. The pore size and the porosity are hard to control, and the horizontal strength of the microporous film is poor because the polymer film is stretched only in a vertical manner. Japanese companies, such as Asahi Kasei, Tonen, and Mitsui Chemicals, form a porous separator having a thickness less than 20 um by using thermally induced phase separation method. Details of thermally induced phase separation method are as follows. The polymer is dissolved in a solvent having high boiling point and low volatility at higher temperature to form a homogeneous solution. Next, as the temperature cools down, the solution generates liquid-solid phase separation or liquid-liquid phase separation. Then, the high boiling point solvent is extracted by a volatile reagent, and is further dried to obtain a high polymer micro-porous film having a specific shape and structure. Although it is easier to control the pore size, the pore size distribution and the porosity in the thermally induced phase separation method than in the method used by the Celgard, the thermally induced phase separation method requires a large volume of solvent during the manufacturing process and employs relatively complicated procedures.

The Teijin Ltd. and the Japan Vilene Co. Ltd. of Japan use a composite material and a pore forming material to form a porous separator (PET non-woven fabric) having a thickness less than 30 μm and an average pore size greater than 5 μm. The pore size is controlled by the pore forming material. The Mitsubishi Corporation of Japan uses fibers of different diameters to form a separator (PET non-woven fabric) having a thickness less than 30 μm and an average pore size>10 μm. The pore size is controlled by composite conditions. The Degussa AG of Germany forms a supporting material (PET non-woven fabric) by using single fiber web spinning technology in which the supporting material is coated with inorganic powder to form a separator having a thickness less than 20 μm. However, the single fiber web spinning technology has following disadvantages. The pore size and the porosity are hard to control, and the horizontal strength of the porous separator is poor because the porous separator is stretched only in a vertical manner. In addition, the pore size is controlled by the amount of inorganic powder and the binder to be greater than 5 μm. Although each of the above methods for manufacturing porous separator by way of stretching or adding an inorganic powder has its own advantages and disadvantages, these methods have the same problem of the pore size being too large (greater than 5 μm), and the porous separator, when the porous separator is applied in separator for power battery, cannot effectively separate the positive polarity and the negative polarity of the battery and will deteriorate the performance of the power battery.

Therefore, how to provide a separator for power battery which matches the needs of development and low cost and at the same time produce excellent separation effect has become a prominent task for the industries.

SUMMARY

The disclosure is directed to a single layer structure of micron or nano fibers and a multi-layer structure of micron and nano fibers applied in a battery separator.

According to one embodiment, a multi-layer structure of micron and nano fibers applied in a battery is provided. The multi-layer structure of micron and nano fibers comprises a web of micron fibers, a web of nano fibers, a mixture layer of fibers, and a resin. The web of micron fibers is formed by a plurality of interweaved micron fibers whose diameter is greater than or equal to 1 μm. The web of nano fibers is formed by a plurality of nano fibers interweaved on the web of micron fibers, wherein the plurality of nano fibers has a diameter less than 1 μm. The mixture layer of fibers is located between the web of nano fibers and the web of micron fibers, and comprises parts of the plurality of interweaved nano and micron fibers. The resin at least impregnates the mixture layer of fibers and parts of the micron fibers of the web of micron fibers. In an experimental example, the multi-layer structure of micron and nano fibers has a porosity of 45%-80%.

According to another embodiment, a single layer structure of micron fibers applied in battery is provided. The single layer structure of micron fibers comprises a web of micron fibers and a resin. The web of micron fibers is formed by a plurality of micron fibers whose diameter is greater than or equal to 1 μm. The micron fibers create pores after being impregnated with resin. The structure of micron fibers has a pore size of 1 nm-500 nm. In an experimental example, the structure of micron fibers has an average pore size of 100 nm-350 nm. In another experimental example, the structure of micron fibers has an average pore size of 100 nm-300 nm.

According to an alternative embodiment, a single layer structure of nano fibers applied in a battery is provided. The single layer structure of nano fibers comprises a web of nano fibers formed by a plurality of interweaved nano fibers whose diameter is less than 1 μm. The structure of nano fibers has a pore size of 1 nm-500 nm. In an experimental example, the structure of nano fibers has a pore size of 10 nm-500 nm and an average pore size of 100-350 nm.

The above and other aspects of the disclosure will become better understood with regard to the following detailed description of the non-limiting embodiment (s). The following description is made with reference to the accompanying drawings.

Figure 1:
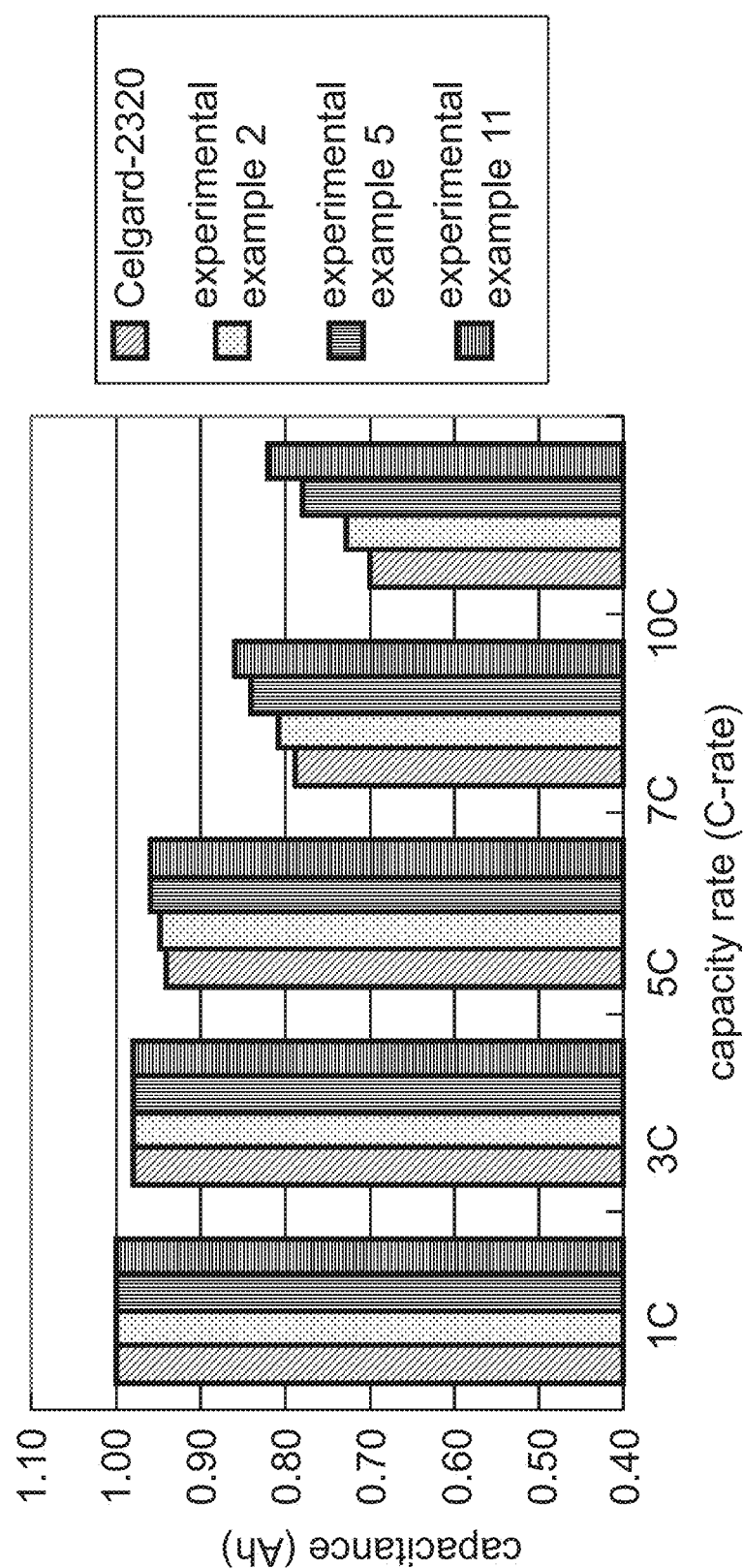
FIG. 1 is a comparison based on results of full battery test with voltage 3.65V between a Celgard-2320 and a single-layer of micron or nano fibers and a multi-layer structure of micron and nano fibers of embodiments of the present invention (experimental examples 2, 5, 11)

In the following detailed description, for purposes of explanation, a plurality of specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

A structure of fibers applied in a separator for a battery such as power lithium battery is disclosed in an embodiment of the invention. The structure of fibers comprises a single layer structure of micron fibers, a single layer structure of nano fibers, and a multi-layer structure of micron and nano fibers. The technology for processing the disclosed structures of fibers is not complicated, and the pore size, the pore size distribution and the porosity of the structures of fibers are easy to control. The manufactured structures of fibers have small pore size, and produce excellent separation effect of separating the positive polarity and negative polarity when applied in a separator for power battery.

<Structure of Micron Fibers>

A single layer structure of micron fibers applied in a battery is provided according to an embodiment. The single layer structure of micron fibers comprises a web of micron fibers and a resin. The web of micron fibers is formed by a plurality of micron fibers whose diameter is greater than or equal to 1 μm. Then, the web of micron fibers is coated with a mixture solution containing the resin, and is further water bathed to remove a solvent of the mixture solution to obtain the web of micron fibers. In an embodiment, the web of micron fibers can be processed with densification treatment (by using a calender machine) to change the thickness of the web of micron fibers, either before the coating process or after the water bathing process, so as to obtain a thin-type separator of micron fibers having a pore size of 1 nm-500 nm.

In an embodiment, the thin-type separator of micron fibers has a pore size of 1 nm-450 nm and an average pore size of 100 nm-350 nm. In an embodiment, the web of micron fibers (that is, separator thickness) has a thickness of 10 μm-40 μm.

In an embodiment, the thin-type separator of micron fibers has a pore size of 100 nm-400 nm and an average pore size of 250 nm-350 nm. In an embodiment, the web of micron fibers has a final thickness of 25 μm (that is, separator thickness).

In another embodiment, the plurality of micron fibers has a diameter of 1 μm-10 μm. Then, the web of micron fibers is processed with densification treatment to form a thin-type separator of micron fibers having a pore size of 200 nm-500 nm and an average pore size of 250 nm-350 nm.

In an embodiment, the micron fibers are formed by materials such as polyethylene terephthalate (PET), polyethylene (PE), or polypropylene (PP).

In an embodiment, the resin is such as polyvinylidene fluoride (PVDF) dissolved in N-Methyl-2-pyrrolidone (NMP), or polyacrylonitrile (PAN) dissolved in dimethylacetamide (DMAc), or other materials satisfying the conditions of application. In an embodiment, the weight ratio between the micron fibers and the resin is 10:5.

<Single Layer Structure of Nano Fibers>

In the present embodiment, a single layer structure of nano fibers applied in a battery is provided. The single layer structure of nano fibers comprises a web of nano fibers formed by a plurality of interweaved nano fibers whose diameter is less than 1 μm by electro-spinning a polymer solution. Following electro-spinning treatment, the web of nano fibers is processed with densification treatment (by using a calender machine) to form a thin-type separator of nano fibers having a pore size of 1 nm-500 nm.

In an embodiment, the thin-type separator of nano fibers has a pore size of 1 nm-500 nm and an average pore size of 100 nm-350 nm. In an embodiment, the web of nano fibers has a final thickness of 5 μm-40 μm (that is, separator thickness).

In an embodiment, the thin-type separator of nano fibers has an average pore size of 50 nm-200 nm and a porosity of 65%.

In an embodiment, the thin-type separator of nano fibers has a pore size of 250 nm-550 nm and an average pore size of 300 nm-450 nm. In an embodiment, the web of nano fibers has a final thickness of 20 μm (that is, separator thickness).

In another embodiment, the plurality of electro-spun nano fibers has a diameter of 1 nm-500 nm, and an average diameter of 10 nm-300 nm. In another embodiment, the plurality of electro-spun nano fibers has a diameter of 10 nm-500 nm and an average diameter of 100 nm-300 nm. Before the electro-spun nano fibers are processed with densification treatment, the electro-spun nano fibers have a pore size of 500 nm-900 nm and an average pore size of 700 nm-800 nm. Then, the electro-spun nano fibers are processed with densification treatment to form a thin-type separator of nano fibers having a pore size of 100 nm-500 nm and an average pore size of 200 nm-350 nm.

In an embodiment, the nano fibers are formed by materials such as pitch fiber, PAN fiber, phenolic fiber, or an ion polymer whose repeat unit is formed according to structural formulas [I] and [II]:

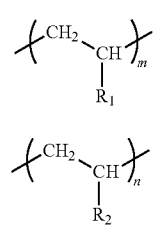

wherein, $R_1$ comprises phenyl sulfonate, and $R_2$ is formed by materials selected from following group comprising:

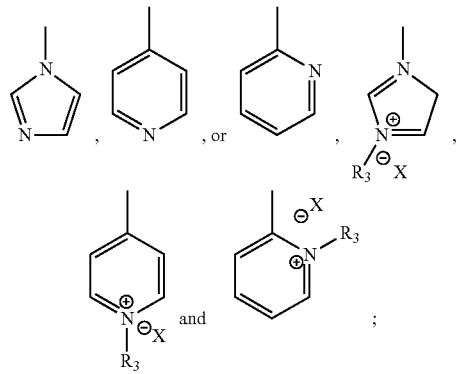

$R_3$ represents amine or sulfonate, X represents chloride, bromide or iodide, m and n are numbers of repeat units, and m/n is between 1/99-99/1.

In an embodiment, the weight ratio between benzene sulfonic acid, amine and sulfonate is 80:10:10 and 50:25:25.

<Multi-Layer Structure of Micron and Nano Fibers>

In the present embodiment, a multi-layer structure of micron and nano fibers applied in a battery is provided. The multi-layer structure of micron and nano fibers comprises a web of nano fibers, a web of micron fibers, a mixture layer of fibers and a resin. The web of micron fibers is formed by a plurality of interweaved micron fibers whose diameter is greater than or equal to 1 μm. The web of nano fibers is formed by a plurality of nano fibers interweaved on the web of micron fibers. The plurality of nano fibers has a diameter less than 1 μm. The mixture layer of fibers is formed by parts of the interweaved nano and micron fibers and located between the webs of nano and micron fibers. The resin at least impregnates the mixture layer of fibers and parts of the micron fibers of the web of micron fibers. The lastly manufactured multi-layer structure of micron and nano fibers (micron+nano) has a pore size of 0.001 μm-0.7 μm and a porosity greater than or equal to 45%. In an embodiment, most micron and nano fibers have a pore size of 100 nm-400 nm.

In an embodiment, the lastly manufactured multi-layer structure of micron and nano fibers has a pore size of 1 nm-400 nm, an average pore size of 50 nm-200 nm, and a porosity of 45%-80%.

In an embodiment, the lastly manufactured multi-layer structure of micron and nano fibers has a pore size of 00 nm-500 nm, an average pore size of 300 nm-400 nm, a porosity greater than or equal to 45%, and the ratio between micron and nano fibers is 10:1. In an embodiment, the micron fibers have a pore size of 10 nm-700 nm and a diameter of 1 μm-10 μm. In an embodiment, the nano fibers have a pore size of 10 nm-500 nm, and a diameter of 1 nm-700 nm. In an embodiment, the nano fibers have an average diameter of 500 nm.

The manufacturing process of the multi-layer structure of micron and nano fibers is disclosed below. Electro-spinning treatment is applied on a polymer solution to interweave the plurality of nano fibers on the web of micron fibers to form a web of micron fibers and a web of nano fibers. In an embodiment, the weight ratio between the micron fibers and the nano fibers of the obtained composite structure is 10:10, and the lastly manufactured multi-layer structure of micron and nano fibers has a pore size of 10 nm-300 nm and an average pore size of 50 nm-150 nm. In another embodiment, the weight ratio between the micron fibers and the nano fibers of the obtained composite structure is 10:5, and the lastly manufactured multi-layer structure of micron and nano fibers has a pore size of 50 nm-400 nm and an average pore size of 100 nm-200 nm.

The resin of the multi-layer structure of micron and nano fibers at least impregnates the mixture layer of fibers and parts of the micron fibers of the web of micron fibers. After the web of nano fibers is formed by the plurality of nano fibers interweaved on the web of micron fibers by electro-spinning a polymer solution, one side of the web of micron fibers is coated with a mixture solution containing the resin and is further water bathed to remove a solvent of the mixture solution to reduce the mixture layer of fibers and pore size of the parts of the micron fibers of the web of micron fibers.

In an embodiment, the weight ratio between the micron fibers, the nano fibers and the resin is 60:20:20 and 65:20:15. The resin is such as PVDF dissolved in NMP, PAN dissolved in DMAc, or other materials satisfying the conditions of application.

In an embodiment, the web of interweaved nano and micron fibers can be processed with densification treatment (by using a calender machine) before the coating process is applied. In addition, having been processed with water bathing process, the multi-layer structure of micron and nano fibers can be processed with densification treatment to form a thin-type composite separator of fibers. In an embodiment, the web of densified micron fibers has a thickness of 10-25 μm and an average thickness of 1 μm-5 μm, and the multi-layer structure of densified micron and nano fibers has a thickness less than 30 μm. The micron fibers and the nano fibers can be formed by materials as disclosed above, or other materials satisfying the conditions of application.

In an embodiment, the nano fibers are electro-spun on a surface of micron non-woven fabric to form a porous supporting material which is further thinned by a rolling machine. Then, the surface of micron non-woven fabric is coated with resin; alternatively, the porous supporting material is impregnated with resin and is rolled such that resin is interposed into the gap of supporting material through micron mesh layer to reduce the pores to form a thin-type two-layer porous structure of micron and nano fibers having a thickness less than 30 µm. The two-layer porous structure of micron and nano fibers can be directly applied in a separator for power battery, such as thin-type lithium battery product or high power lithium battery product. The multi-layer structure of micron and nano fibers of the present embodiment has a pore size of 0.001 µm-0.7 µm. Most pore sizes of the two-layer structure of micron and nano fibers are between 0.1 µm-0.4 µm and are relatively smaller than that of conventional non-woven fabric being greater than 5 µm. When the two-layer structure of micron and nano fibers is applied in a separator for power battery, the separation effect of separating the positive and the negative polarities of the battery can be largely enhanced. In addition, the multi-layer structure of micron and nano fibers of the present embodiment has a porosity of 45-80%, and most porosities are above 50%. In comparison to existing porous separators having a porosity of 40%, the two-layer structure of micron and nano fibers of the present embodiment has higher porosity (higher ion conduction velocity). Therefore, when the separator using the multi-layer structure of micron and nano fibers of the present embodiment is applied in a power battery product, the separator produces better separation effect due to smaller pore size and higher porosity.

The contents of parts of experimental example of single layer structure of micron or nano fibers and multi-layer structure of micron and nano fibers are disclosed below. The contents comprise manufacturing methods and tests of properties of fiber structure. However, anyone who is skilled in the technology field of the present invention will understand that experimental contents of experimental examples, such as manufacturing procedures and selected materials, are for exemplification only, not for limiting the scope of protection of the present invention, and various modifications and variations can be made to the manufacturing procedures or selection of materials according to the needs in actual implementation.

<Single Layer Structure of Micron Fibers-Experimental Examples 1-4>

|  | Benzene Sulfonic Acid | Amine | Sulfonate |
| --- | --- | --- | --- |
| Experimental Example 1 | 80 wt % | 10 wt % | 10 wt % |
| Experimental Example 2 | 65 wt % | 20 wt % | 15 wt % |
| Experimental Example 3 | 50 wt % | 25 wt % | 25 wt % |
| Experimental Example 4 | 30 wt % | 35 wt % | 35 wt % |

Experimental example 1: polypropylene (PP) is electro-spun to form a non-woven fabric having a basic weight of 10 g/m$^2$ and a thickness of 70 µm. Next, the non-woven fabric is processed with densification treatment by using a calender machine (at a rotation speed of 15 Hz and a temperature of 70° C.) to form a thin-type non-woven fabric having a thickness of 20 µm. Then, polyvinylidene fluoride (PVDF with molecular weight being 50/mol) and alumina (2%, particle size is 13 nm) are dissolved in N-Methyl-2-pyrrolidone (NMP) solution to form a mixture solution. Then, a surface of the polypropylene (PP) non-woven fabric base is coated with the mixture solution (PVDF:NMP=15:85) at a rotation speed of 34 rpm and is further water bathed to remove NMP solvent. Then, the separator (at a rotation speed of 15 Hz and a temperature of 70° C.) is processed with densification treatment to by using a calender machine to form a thin-type separator of micron fibers (fiber:PVDF=10:5). The properties of the thin-type separator of micron fibers are measured as below. The thin-type separator of micron fibers has a thickness of 25 µm, a pore size of 100 nm-400 nm, an average pore size of 250 nm-350 nm, a porosity of 47%, and a McMullin value of 6. The McMullin value is a ratio between separator resistance and electrolyte resistance, and the smaller the McMullin value, the higher the ionic conductivity.

Experimental example 2: polypropylene (PP) is electro-spun to form a non-woven fabric having a basic weight of 10 g/m$^2$, and a thickness of 70 µm. Next, the non-woven fabric is processed with the thinning treatment by using a calender machine (at a rotation speed of 15 Hz and a temperature of 70° C.) to form a thin-type non-woven fabric having a thickness of 20 µm. Then, polyvinylidene fluoride (PVDF with molecular weight being 20 g/mol) is dissolved in N-Methyl-2-pyrrolidone (NMP) solution to form a mixture solution (PVDF:NMP=7:93). Then, a surface of the thin-type non-woven fabric is coated with the mixture solution to reduce size of pores between fibers and is further water bathed to remove NMP solvent. Then, the separator is processed with densification treatment by using a calender machine (at a rotation speed of 15 Hz and a temperature of 70° C.) to form a thin-type separator of micron fibers (fiber:PVDF=10:5). The properties of the thin-type separator of micron fibers are measured as below. The thin-type separator of micron fibers has a thickness of 26 µm, a pore size of 10 nm-500 nm, an average pore size of 100 nm-300 nm, a porosity of 50%, and a McMullin value of 8.

Experimental example 3: polypropylene (PP) is electro-spun to form a non-woven fabric having a basic weight of 10 g/m$^2$ and a thickness of 70 µm. Next, the non-woven fabric is processed with thinning treatment by using a calender machine (at a rotation speed of 15 Hz and a temperature of 70° C.) to form a thin-type non-woven fabric having a thickness of 20 µm. Then, polyacrylonitrile (PAN-procured from the Tong-Hwa Synthetic Fiber Company Limited) is dissolved in dimethylacetamide (DMAc) (PAN:DMAc=13:87). Then, a surface of the thin-type non-woven fabric is coated with the mixture solution to reduce size of pores between fibers and is further water bathed to remove DMAc solvent. Then, the separator is processed with densification treatment by using a calender machine (at a rotation speed of 15 Hz and a temperature of 70° C.) to form a thin-type separator of micron fibers (fiber:PVDF=10:5). The properties of the thin-type separator of micron fibers are measured as below. The thin-type separator of micron fibers has a thickness of 23 µm, a pore size of 200 nm-450 nm, an average pore size of 250 nm-350 nm, a porosity of 45%, and a McMullin value of 9.

Experimental example 4: polypropylene (PP) is electro-spun to form a non-woven fabric having a basic weight of 10 g/m$^2$. Next, the non-woven fabric is processed with densification treatment by using a calender machine (at a rotation speed of 15 Hz and a temperature of 70° C.) to form a thin-type non-woven fabric having a thickness of 20 µm. Then, polyvinylidene fluoride (PVDF with molecular weight being 50 g/mol) and alumina (10%, particle size is 13 nm) are dissolved in N-Methyl-2-pyrrolidone (NMP) solution to form a mixture solution. Then, a surface of the polypropylene (PP) non-woven fabric base is coated with the mixture solution (PVDF:NMP=15:85) at a rotation speed of 34 rpm and is further water bathed to remove NMP solvent. Then, the separator is processed with densification treatment by using a calender machine (at a rotation speed of 15 Hz and a temperature of 70° C.) to form a thin-type separator of micron fibers (fiber:PVDF=10:5). The properties of the thin-type separator of micron fibers are measured as below. The thin-type separator of micron fibers has a thickness of 22 μm, a pore size of 10 nm-400 nm, an average pore size of 50 nm-200 nm, a porosity of 65%, and a McMullin value of 5.

It can be known from three of the four disclosed experimental examples 1-4 of single layer structure of micron fibers that the single layer structure of micron fibers of the present embodiment has a pore size (such as 100-350 nm) being smaller than that of conventional separator (>5 μm) and has a porosity (>45%) higher than that of conventional separator (40%). Therefore, the power battery using the structure of the present embodiment as a separator film has better performance.

<Single Layer Structure of Nano Fibers: Experimental Examples 5-7>

|  | Benzene Sulfonic Acid | Amine | Sulfonate |
| --- | --- | --- | --- |
| Experimental Example 5 | 80 wt % | 10 wt % | 10 wt % |
| Experimental Example 6 | 50 wt % | 25 wt % | 25 wt % |
| Experimental Example 7 | 30 wt % | 35 wt % | 35 wt % |

Experimental example 5: the ion polymer formed according to disclosed structural formulas is electro-spun to form meshed nano polymer fiber having a diameter of 10 nm-700 nm and used for forming a web of nano fibers. Next, the non-woven fabric is processed with densification treatment by using a calender machine (temperature 70° C.) to form a thin-type separator of nano fibers. The properties of the thin-type separator of micron fibers are measured as below. The thin-type separator of nano fibers has a thickness of 20 μm, a pore size of 250 nm-550 nm, an average pore size of 300 nm-450 nm, a porosity of 65%, and a McMullin value of 6.

Experimental example 6: the ion polymer formed according to disclosed structural formulas is electro-spun to form meshed nano polymer fiber having a diameter of 100 nm-500 nm and used for forming a web of nano fibers. Next, the non-woven fabric is processed with densification treatment by using a calender machine (temperature 70° C.) to form a thin-type separator of nano fibers. The properties of the thin-type separator of micron fibers are measured as below. The thin-type separator of nano fibers has a thickness of 15 μm, a pore size of 10 nm-500 nm, an average pore size of 100 nm-300 nm, a porosity of 55%, and a McMullin value of 7.

Experimental example 7: the ion polymer formed according to disclosed structural formulas is electro-spun to form meshed nano polymer fiber having a diameter of 10 nm-300 nm and used for forming a web of nano fibers. Next, the non-woven fabric is processed with densification treatment by using a calender machine (temperature 70° C.) to form a thin-type separator of nano fibers. The properties of the thin-type separator of micron fibers are measured as below. The thin-type separator of nano fibers has a thickness of 12 μm, a pore size of 1 nm-400 nm, an average pore size of 50 nm-150 nm, a porosity of 75%, and a McMullin value of 5.

It can be known from two of the disclosed experimental examples 5-7 of single layer structure of nano fiber that the single layer structure of nano fiber of the present embodiment has a pore size (10 nm-550 nm) less than that of conventional separator (>5 μm), and has a porosity (52%-75%) significantly higher than that of conventional separator (40%).

<Multi-Layer Structure of Micron and Nano Fibers: Experimental Examples 8-11>

|  | Benzene Sulfonic Acid | Amine | Sulfonate |
| --- | --- | --- | --- |
| Experimental Example 8 | 80 wt % | 10 wt % | 10 wt % |
| Experimental Example 9 | 65 wt % | 20 wt % | 15 wt % |
| Experimental Example 10 | 50 wt % | 25 wt % | 25 wt % |
| Experimental Example 11 | 30 wt % | 35 wt % | 35 wt % |

Experimental example 8: the ion polymer formed according to disclosed structural formulas having a basic weight of 1 g/m² is electro-spun on one single side of polypropylene (PP) non-woven fabric having a basic weight of 10 g/m² and a thickness of 70 μm to form a two-layer web of fiber. Then, the two-layer web of fibers is processed with thinning treatment by using a calender machine (at a rotation speed of 15 Hz and a temperature of 70° C.) to form a thinned PP non-woven fabric having a thickness of 20 μm. Then, polyvinylidene fluoride (PVDF with molecular weight being 20 g/mol) dissolved in N-Methyl-2-pyrrolidone (NMP) solution to form a mixture solution (PVDF:NMP=7:93). Then, a surface of the thinned PP non-woven fabric is coated with the mixture solution to reduce size of pores between fibers and is further water bathed to remove NMP solvent. Then, the separator is processed with densification treatment by using a calender machine (at a rotation speed of 15 Hz and a temperature of 70° C.) to form a thin-type composite separator of fibers (fiber:PVDF=11:5). The properties of the thin-type composite separator of fibers are measured as below. The thin-type separator of micron fibers has a thickness of 22 μm, a pore size of 100 nm-400 nm, an average pore size of 150 nm-250 nm, a porosity of 53%, and a McMullin value of 6.

Experimental example 9: the nano fiber of the ion polymer formed according to disclosed structural formulas [I] having a basic weight of 10 g/m2 is electro-spun on one single side of polypropylene (PP) non-woven fabric having a basic weight of 10 g/m² and a thickness of 70 μm to form a two-layer web of fiber. Then, the two-layer web of fibers is processed with thinning treatment by using a calender machine (at a rotation speed of 15 Hz and a temperature of 70° C.) to form a thin-type composite separator of fibers. The properties of the thin-type composite separator of fibers are measured as below. The thin-type separator of micron fibers has a thickness of 30 μm, a pore size of 10 nm-300 nm, an average pore size of 50 nm-150 nm, a porosity of 45%, and a McMullin value of 7.

Experimental example 10: the nano fiber of the ion polymer having a basic weight of 5 g/m² is electro-spun on one single side of polypropylene (PP) non-woven fabric having a basic weight of 10 g/m² and a thickness of 70 μm to form a two-layer web of fiber. Next, the two-layer web of fibers is processed with thinning treatment by using a calender machine (at a rotation speed of 15 Hz and a temperature of 70° C.) to form a thinned PP non-woven fabric having a thickness of 23 μm. Then, polyacrylonitrile (PAN-procured from the Tong-Hwa Synthetic Fiber Company Limited) is dissolved in dimethylacetamide (DMAc) (PAN:DMAc=13:87). Then, a surface of the thin-type non-woven fabric is coated with the mixture solution to reduce size of pores between fibers and is further water bathed to remove DMAc solvent. Then, the separator is processed with densification treatment by using a calender machine (at a rotation speed of 15 Hz and a temperature of 70° C.) to form a thin-type composite separator of fibers (fiber:PAN=15:5). The properties of the thin-type composite separator of fibers are measured as below. The thin-type separator of micron fibers has a thickness of 25 μm, a pore size of 50 nm-400 nm, an average pore size of 100 nm-200 nm, a porosity of 50%, and a McMullin value of 5.

Experimental example 11: the nano fiber of the ion polymer having a basic weight of 5 g/m² is electro-spun on one single side of polypropylene (PP) non-woven fabric having a basic weight of 10 g/m² and a thickness of 70 μm to form a two-layer web of fiber. Next, the two-layer web of fibers is processed with thinning treatment by using a calender machine (at a rotation speed of 15 Hz and a temperature of 70° C.) to form a thin-type non-woven fabric having a thickness of 23 μm. Then, polyacrylonitrile (PAN-procured from the Tong-Hwa Synthetic Fiber Company Limited) is dissolved in dimethylacetamide (DMAc) (PAN:DMAc=8:92). Then, a surface of the thin-type non-woven fabric is coated with the mixture solution to reduce size of pores between fibers and is further water bathed to remove DMAc solvent. Then, the separator is processed with densification treatment by using a calender machine (at a rotation speed of 15 Hz and a temperature of 70° C.) to form a thin-type composite separator of fibers (fiber:PAN=10:5). The properties of the thin-type composite separator of fibers are measured as below. The thin-type separator of micron fibers has a thickness of 20 μm, a pore size of 1 nm-300 nm, an average pore size of 50 nm-150 nm), a porosity of 70%, and a McMullin value of 5.

It can be known from three of the disclosed experimental examples 8-11 of multi-layer structure of micron and nano fiber that the multi-layer structure of micron and nano fibers of the present embodiment has a pore size (10 nm-400 nm) less than that of conventional separator (>5 μm) and a porosity (45-70%) significant higher than that of conventional separator (40%). Therefore, the power battery using the structure of the present embodiment as a separator film has better performance.

<Comparison Between Multi-Layer Structure of Micron and Nano Fibers of Embodiment of the Present Invention and Conventional Separators>

Table 1 shows a comparison of properties between single layer structure of micron or nano fibers and multi-layer structure of micron and nano fibers of experimental example and conventional separators of the Celgard, LLC and the Asahi Kasei.

Comparison of properties as illustrated in Table 1 shows that the multi-layer structure of micron and nano fibers of disclosed embodiments has a very small pore size which can be as small as 0.15 μm, and has better size stability, porosity and McMullin value, and the thermal shrinkage at temperature of 130° C. is 0. Therefore, battery separator using the multi-layer structure of micron and nano fibers of disclosed embodiments has better overall performance.

TABLE 1

|  | Celgard, LLC | Asahi Kasei | Experimental Example 2 | Experimental Example 5 | Experimental Example 11 |
|---|---|---|---|---|---|
| Base | Tri-Layer Porous Film | Single-Layer Porous Film | Micron Fibers | Nano Fibers | Fiber Composite |
| Thickness (μm) | 20 | 20 | 26 | 20 | 20 |
| Size Stability (° C.) | <130° C. | <130° C. | >160° C. | >160° C. | >160° C. |
| Thermal Shrinkage (%, @ 130° C.) | 42.5 | 84.5 | 0 | 0 | 0 |
| Porosity (%) | 40 | 40 | 50 | 65 | 70 |
| Pore Size (μm) | 0.1 | 0.1 | 0.2 | 0.35 | 0.15 |
| Mechanical Strength (N/cm) | 13 | 20 | 19 | 15 | 17 |
| McMullin | 12 | 12 | 8 | 6 | 5 |

<High Power Lithium Battery Discharge Capacitance and Self Discharge Test>

In following experiments, relevant tests are performed on a Celgard-2320 (a separator of the Celgard, LLC) and a single layer structure of micron or nano fibers and a multi-layer structure of micron and nano fibers of disclosed embodiments (such as experimental examples 2, 5, 11).

1. Full Battery Test

Charge and discharge current (ampere) is normally represented by number of times of battery marked capacity and is referred as capacity rate (C-rate), wherein C represents the volume of current during the charge/discharge of battery. For example, when the marked capacity of a charge battery is 1.1 Ah, this indicates that the battery can last for 1 hour if the discharge rate is 1.1 Ah (1 C) and can last for 5 hours if the discharge rate is 200 mA (0.2 C).

FIG. 1 is a comparison based on results of full battery test with voltage 3.65V between a Celgard-2320 and a single-layer of micron or nano fibers and a multi-layer structure of micron and nano fibers of embodiments of the present invention (experimental examples 2, 5, 11). In the present experiment, the battery is charged/discharged at different discharge rates (C-rate), such as 1 C, 3 C, 5 C, 7 C, and 10 C. The comparison of FIG. 1 shows that when the battery the battery is charged/discharged at high discharge rates 5 C and 7 C, the charge/discharge performances of the single layer structure of micron fibers (experimental example 2), the single layer structure of nano fiber (experimental example 5) and the multi-layer structure of micron and nano fibers (experimental example 11) of disclosed embodiments are all superior to that of the Celgard-2320. When discharge rate reaches 100, the charge/discharge performances of the single layer structure of nano fiber (experimental example 5) and the multi-layer structure of micron and nano fibers (experimental example 11) are more significantly superior to that of the Celgard-2320.

2. Cyclic Charge/Discharge Test for Long Duration

Figure 2:
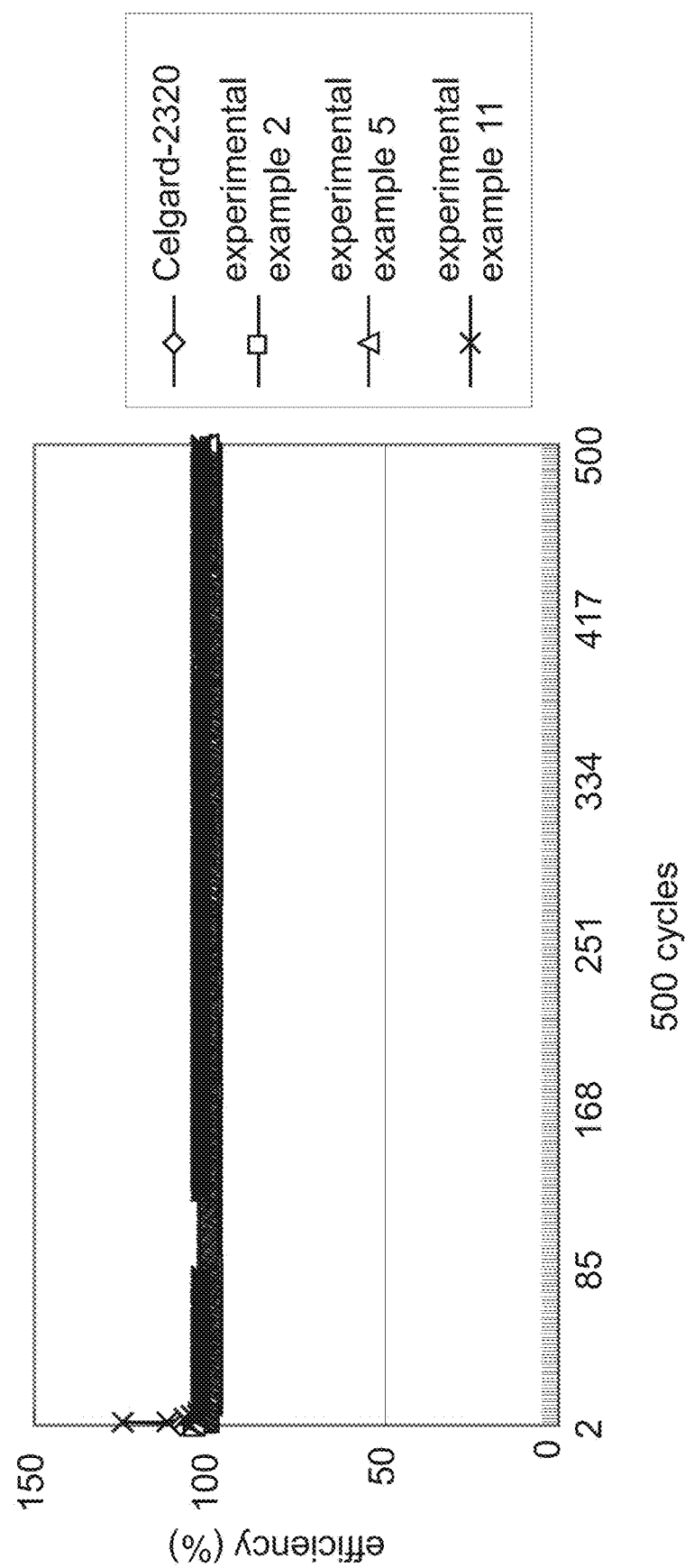
FIG. 2 is a comparison based on results of 500 cycles of charge/discharge test with charge/discharge rate 3 C between a Celgard-2320 and a single-layer of micron or nano fibers and a multi-layer structure of micron and nano fibers of embodiments of the present invention (experimental examples 2, 5, 11)

FIG. 2 is a comparison based on results of 500 cycles of charge/discharge test with charge/discharge rate 3 C between a Celgard-2320 and a single-layer of micron or nano fibers and a multi-layer structure of micron and nano fibers of embodiments of the present invention (experimental examples 2, 5, 11). Under normal use, cycle life (number of cycles) of a lithium battery is more than 500 cycles. The lithium battery can be charged/discharged for 1-500 cycles for a long duration at the charge/discharge rate 3 C/3 C. It can be known from the results of FIG. 2 that after having been charged/discharged for 500 cycles, all test samples have charge/discharge efficiency of 100%.

3. Self Discharge Test: At Temperature of 60° C.

Figure 3:
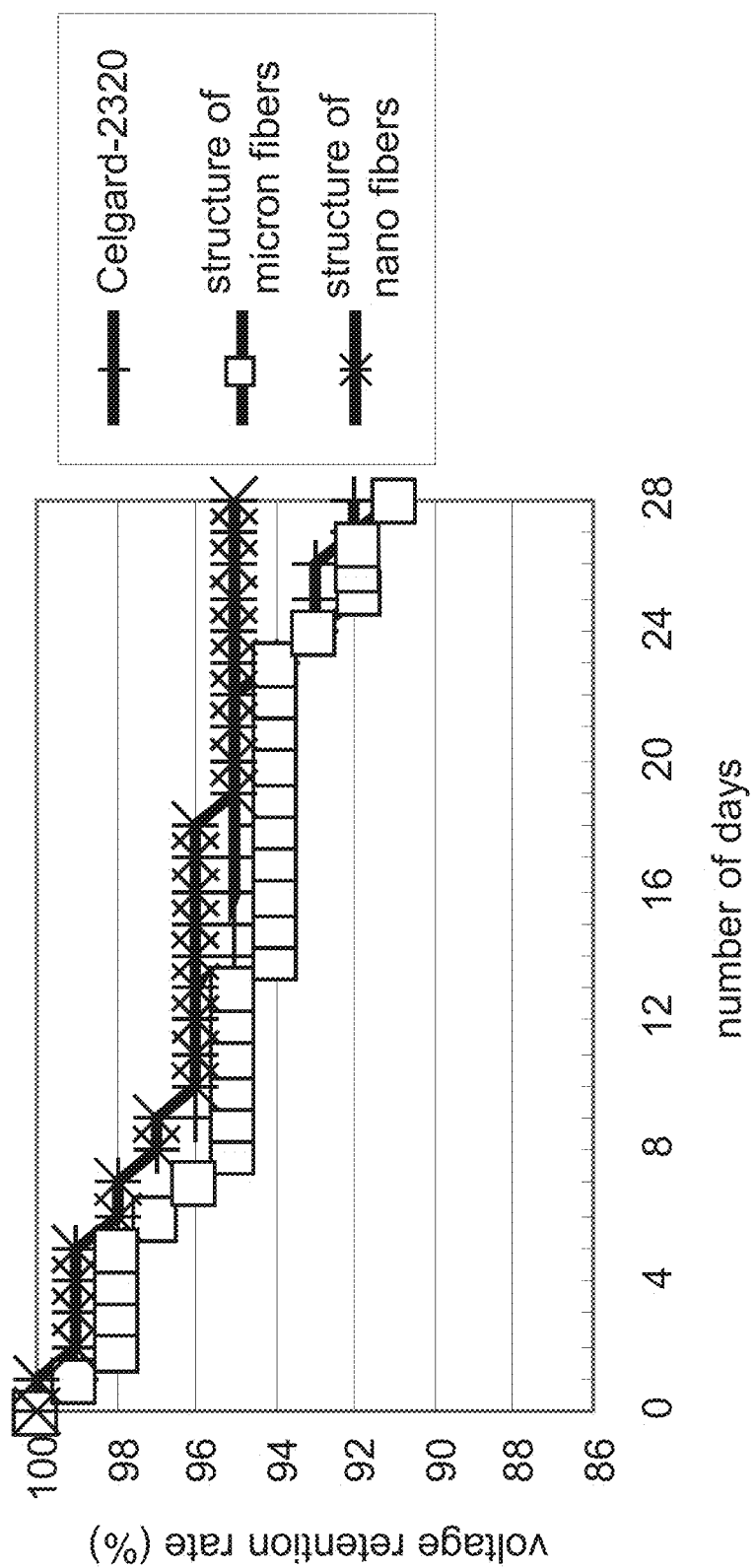
FIG. 3 is a comparison based on self discharge test at temperature of 60° C. between a Celgard-2320 and a single-layer of micron or nano fibers and a multi-layer structure of micron and nano fibers of embodiments of the present invention.

No matter a battery is used or not, as time passes by, the battery will experience power loss due to various reasons. FIG. 3 is a comparison based on self discharge test at temperature of 60° C. between a Celgard-2320 and a single-layer of micron or nano fibers and a multi-layer structure of micron and nano fibers of embodiments of the present invention. It can be known from the results of FIG. 3 that after 28 days, the single-layer structure of micron fibers and the Celgard-2320 retain at least 91% of voltage, and the single layer structure of nano fibers retains 95% of voltage which is superior to that of the Celgard-2320 (91%).

4. Cross-Sectional View of Structure

Figure 4B:
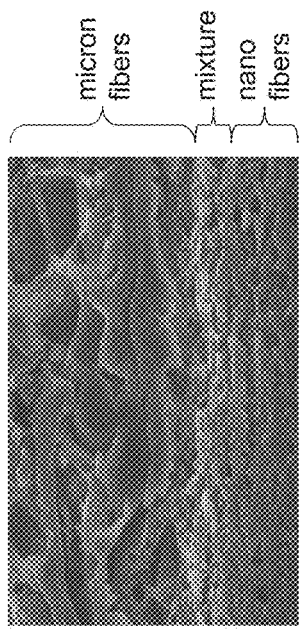
FIG. 4B is a cross-sectional view of a multi-layer structure of micron and nano fibers of an embodiment shot with an SEM.
Figure 4A:
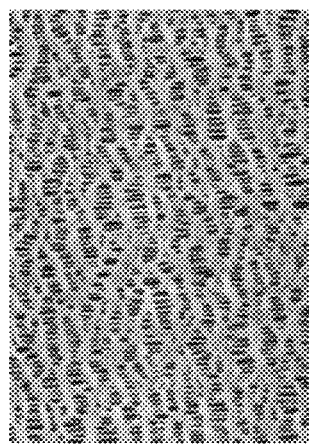
FIG. 4A is a cross-sectional view of a Celgard-2320 shot with a scanning electron microscope (SEM)

FIG. 4A is a cross-sectional view of a Celgard-2320 shot with a scanning electron microscope (SEM). FIG. 4B is a cross-sectional view of a multi-layer structure of micron and nano fibers of an embodiment shot with an SEM. As indicated in FIG. 4A, the Celgard-2320 is a dry-type porous film on which slit pores are formed when lamellae structure is separated after the polymer film is vertically stretched, and is different from the multi-layer structure of micron and nano fibers as illustrated in embodiment of FIG. 4B. The pore size and the porosity of the Celgard-2320 are hard to control, and the horizontal strength of the porous film is weaker. The structures of fibers of disclosed embodiments have following advantages. The processing technology is not complicated, the pore size, the pore size distribution and the porosity are easy to control, the manufactured structures of fibers have small pore size and uniform distribution of pore size, and excellent performance can be produced when the structures of fibers of disclosed embodiments are applied in separator for power battery.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A single layer structure of micron fibers applied in a battery, comprising a web of micron fibers and a resin, wherein the web of micron fibers is formed by a plurality of micron fibers impregnated by the resin, the plurality of micron fibers have a diameter greater than or equal to 1 μm, and the web of micron fibers has a pore size of 1 nm-500 nm.

2. The single layer structure of micron fibers according to claim 1, wherein, the web of micron fibers having a pore size of 1 nm-500 nm is obtained after the web of micron fibers is coated with a mixture solution containing the resin and is further water bathed to remove a solvent of the mixture solution.

3. The single layer structure of micron fibers according to claim 1, wherein the plurality of micron fibers are formed by materials such as polyethylene terephthalate (PET), polyethylene (PE), or polypropylene (PP).

4. The single layer structure of micron fibers according to claim 1, wherein the resin is polyvinylidene fluoride (PVDF) dissolved in N-Methyl-2-pyrrolidone (NMP), or polyacrylonitrile (PAN) dissolved in dimethylacetamide (DMAc).

5. The single layer structure of micron fibers according to claim 1, having a pore size of 1 nm-450 nm and an average pore size of 100 nm-350 nm.

6. The single layer structure of micron fibers according to claim 1, wherein the plurality of micron fibers have a diameter of 1 μm-10 μm.

7. The single layer structure of micron fibers according to claim 1, wherein the web of micron fibers has a thickness of 10 μm-40 μm.

8. The single layer structure of micron fibers according to claim 1, wherein a weight ratio between the plurality of micron fibers and the resin is 10:5.

* * * * *